United States Patent [19]
Brudy

[11] 3,774,959
[45] Nov. 27, 1973

[54] CONVERTIBLE TOP INTERCONNECTION

[75] Inventor: Peter E. Brudy, Willowdale, Ontario, Canada

[73] Assignee: Aqua-Marine Mfg. Limited, Toronto, Ontario, Canada

[22] Filed: Apr. 24, 1972

[21] Appl. No.: 246,866

[30] Foreign Application Priority Data
Apr. 22, 1971   Great Britain.................. 10,775/71

[52] U.S. Cl.................. 296/121, 135/6, 296/137 R
[51] Int. Cl................................................ B60j 7/18
[58] Field of Search.................... 296/137 R, 120 A, 296/120 R, 91, 103, 107, 121; 220/60 R, 82 R; 135/6

[56] References Cited
UNITED STATES PATENTS

| | | |
|---|---|---|
| 3,172,419 | 3/1965 | Lewis..................................... 135/6 |
| 3,149,747 | 9/1964 | Burgess............................. 220/60 R |
| 3,311,406 | 3/1967 | Fritsch................................... 296/91 |
| 3,122,394 | 2/1964 | Brydon............................ 296/120 R |
| 3,093,845 | 6/1963 | Brock et al. ................. 296/120 R X |
| 3,080,993 | 3/1963 | Livingstone.................... 220/60 A X |
| 3,499,574 | 3/1970 | Yates, Jr. ............................. 220/60 R |
| 3,583,757 | 6/1971 | Wilfert et al...................... 296/84 C |

Primary Examiner—Leo Friaglia
Assistant Examiner—David M. Mitchell
Attorney—Sims and McBurney

[57] ABSTRACT

An interconnection for a convertible top cover of a marine craft includes cooperating integral members of the windshield and cover. The interconnection is shaped to prevent air pressure-induced disconnection of the interconnection.

4 Claims, 1 Drawing Figure

PATENTED NOV 27 1973　　　　　　　　　　　3,774,959
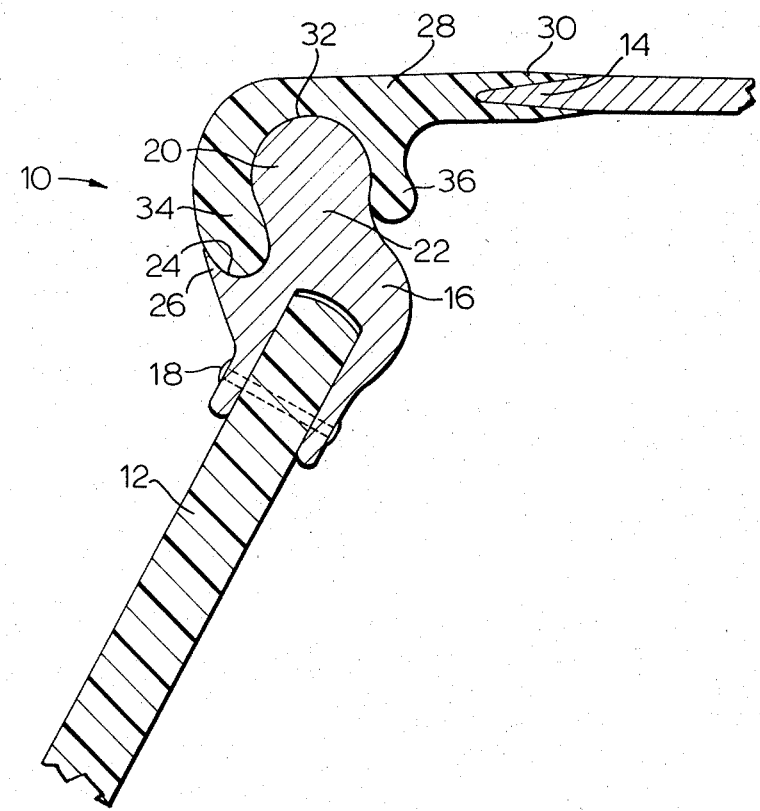

CONVERTIBLE TOP INTERCONNECTION

This invention relates to an interconnection of a retractable or removable flexible cover with a windshield, especially the windshield of a marine pleasure craft.

In U.S. Pat. No. 3,122,394 there is described a typical prior art interconnection, in which the flexible cover assembly is wedged between a windshield extrusion and the windshield itself. Usually the extrusion is metallic, and extends across the width of the windshield. The use of pleasure craft including this prior art system in exposed climatic conditions may hinder proper functioning of the interlock, due to the differing coefficients of thermal expansion of the varying materials involved in forming the interlock.

The present invention seeks to overcome this defect by providing a novel interconnection which comprises a rigid extrusion secured to and extending substantially the width of the windshield and a flexible extrusion which receives the rigid extrusion in releasable interconnecting relationship.

The invention is illustrated by way of example with reference to the accompanying drawing, which is a cross-sectional view of one embodiment of the interconnection of the invention in the assembled position.

The interconnection 10 is achieved between a windshield 12 and a convertible top cover 14. The windshield 12 may be constructed from any convenient material, and in marine pleasure craft usually the windshield is constructed of vinyl polymeric material. The convertible top cover 14 similarly may be formed of any desired material. In marine pleasure craft, the material is usually canvas or nylon. The cover 14 encloses a cabin area of the marine craft and may protect the occupants of the cabin area from prevailing weather conditions.

An elongated extrusion 16 extending substantially the width of the windshield 12 and upwardly therefrom is affixed thereto in any convenient manner, such as by fastening pins 18. If it is desired, however, to provide an interconnection for a convertible top which does not extend the full width of the windshield, then an extrusion 16 need be provided across the relevant width of the windshield 12.

The extrusion 16 is constructed of rigid material, such as a rigid plastic material, or a corrosion resistant metallic material, such as brass.

The extrusion 16 has a cross sectional shape including a part circular upper or head portion 20 integrally connected with a base portion thereof 21 through a waist 22. The extrusion includes along the side thereof facting the intended direction of motion of the pleasure craft a channel 24 defined by one side of the waist 22 and a projection 26 spaced from the waist 22.

A cooperating flexible extrusion 28 is affixed to the leading edge of the convertible top cover in any convenient manner, such as by stitching, or the like, at 30. The extrusion 28 may be constructed of any flexible material, such as a flexible synthetic polymeric material.

The flexible extrusion 28 is formed with a channel 32 of substantially the mirror image cross sectional shape of the outer surface of head portion 20 of the extrusion 16, so that the extrusions may cooperate to form an interconnection. The flexible extrusion 28 in cross section includes arms 34 and 36 which define the channel 32 and, in the locked position shown, project downwardly and terminate adjacent the waist portion 22, with the arm 34 projecting into the channel 24.

The channel 24 is dimensioned so that the arm 34 is readily received within the channel without subjecting the wall to compressive forces. If this is not the case, there may exist a tendency, due to resilience of the arm, for the interconnection to be released.

The channel 32 may be dimensioned so that when the interconnection is assembled as shown, compressive forces are exerted on the head 20 by the flexible extrusion 28. It is preferred, however, to dimension the channel 32 so that while a snug fit is achieved between the extrusions, only during assembly of the interconnection 10 by pushing the flexible extrusion 28 onto the extrusion 16 causing deflection of the arms 34 and 36 are any compressive forces exerted on the rigid extrusion 16 by the flexible extrusion 28.

As may be seen in the drawing, the projection 26 defining one side of the channel 24 overlaps the forward arm 34 of the flexible extrusion 28. The provision of the projection 26 in this overlapping relation provides an aerodynamic flow over outer surface of the flexible extrusion 28 during motion of the marine craft, so that air pressure is prevented from building up under the arm 34, which otherwise may cause it to lift and disconnect the two extrusions. The projection 26 thereby constitutes an air deflection shield which controls the flow of air adjacent the interconnection during forward motion of the craft. The provision of the aerodynamic flow over the outer surface of the flexible extrusion 28 may be achieved in other manners.

It obviously is important to prevent release of the interlock during motion, especially when the craft is moving at high speed or when being towed by a motor vehicle. Hence, the provision of the projection 26 overlapping the arm 34 is an important feature of the present invention.

Additionally, the interconnection 10 may be achieved or disconnected readily from the cabin area of the marine craft, in contrast to many prior art interconnections of this type wherein it is necessary to connect or disconnect the cover and the windshield from outside of the craft.

Modifications may be made within the scope of the invention.

What I claim is:

1. A passenger transporting device having a passenger compartment and a forward end, a windshield situated forwardly of said passenger compartment, a cover member for said passenger compartment interconnectable with said windshield, and interconnection means connecting said windshield and said cover, said interconnection means comprising a first part connected to said windshield and a second part connected to said cover, said first part including a first elongated rigid extrusion extending across at least a portion of the width of said windshield and projecting upwardly from and affixed to the upper edge thereof, said extrusion having a cross-sectional shape including a base portion affixed to said windshield and a part circular head portion integrally connected to said base portion through a waist portion, said second part including a second elongated flexible extrusion affixed to the edge of said cover nearest said forward end and extending across at least a portion of the width of said cover coinciding with said portion of the width of said windshield, said second extrusion having a cross-sectional shape including a pair of downwardly projecting arms defining therebetween a part circular channel of complimentary shape to said head portion of said first extrusion, said arms surrounding, gripping and enclosing said head portion when said cover and windshield are connected and terminating in said waist portion, an air deflection shield integral with said base portion of said first extrusion and positioned to control the flow of air adjacent said interconnection during forward motion of said device, said shield deflecting air during said motion away from the lower extremity of the one of said pair of arms nearest said forward end, thereby inhibiting a tendency of said second part to be disconnected from said first pair by air pressure on said one arm.

2. A marine craft having a passenger compartment and a forward end, a windshield situated forwardly of said passenger compartment, a cover member for said passenger compartment interconnectable with said windshield, and interconnection means connecting said windshield and said cover, said interconnection means comprising a first part connected to said windshield and a second part connected to said cover, said first part including a first rigid elongated extrusion extending across at least a portion of the width of said windshield and projecting upwardly from the upper end thereof, said extrusion having a cross-sectional shape including a base portion affixed to said windshield, a part circular head portion integrally connected to said base portion through a waist portion and a finger integral with and projecting from said base portion and defining a channel with the side of said waist portion nearest said forward end, said second part including a second elongated flexible extrusion affixed to the edge of said cover closest to said forward end and extending across at least a portion of the width of said windshield coinciding with said portion of the width of said windshield, said second extrusion having a cross-sectional shape including a pair of downwardly projecting arms defining therebetween a part-circular channel of complimentary shape to said head portion of said first extrusion means, said arms surrounding, gripping and enclosing said head portion when said cover and windshield are connected and terminating in said waist portion, the one of said two arms nearest said forward end terminating in said first-mentioned channel in non-compressive fit therein whereby air is directed over said second part away from the lower extremity of said one arm during forward motion of said craft.

3. The marine craft of claim 2 wherein said first extrusion extending substantially across the width of said windshield and said second extrusion extends co-extensively with said first extrusion.

4. The marine craft of claim 2 wherein said windshield is positioned in a first plane at an angle to the horizontal rearwardly of said forward end and said first extrusion extends in a second plane at an angle greater than 90° to said first plane towards said forward end.

* * * * *